(12) United States Patent
Park et al.

(10) Patent No.: US 10,359,223 B2
(45) Date of Patent: Jul. 23, 2019

(54) COMPRESSOR DRIVING APPARATUS AND AIR CONDITIONER INCLUDING THE SAME

(71) Applicant: LG ELECTRONICS INC., Seoul (KR)

(72) Inventors: Cheonsu Park, Seoul (KR); Seunghyo Kim, Seoul (KR); Donggi Eom, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 69 days.

(21) Appl. No.: 15/457,439

(22) Filed: Mar. 13, 2017

(65) Prior Publication Data

US 2017/0261246 A1    Sep. 14, 2017

(30) Foreign Application Priority Data

Mar. 14, 2016 (KR) .................. 10-2016-0030222
Apr. 29, 2016 (KR) .................. 10-2016-0053321

(51) Int. Cl.

| | |
|---|---|
| F25B 49/02 | (2006.01) |
| H02P 21/22 | (2016.01) |
| H02P 27/08 | (2006.01) |
| H02P 29/62 | (2016.01) |
| F25B 13/00 | (2006.01) |

(52) U.S. Cl.
CPC ............ *F25B 49/025* (2013.01); *H02P 21/22* (2016.02); *H02P 27/08* (2013.01); *H02P 29/62* (2016.02); *F25B 13/00* (2013.01); *F25B 2500/26* (2013.01); *F25B 2600/021* (2013.01); *F25B 2700/151* (2013.01); *H02P 2203/09* (2013.01); *Y02B 30/741* (2013.01)

(58) Field of Classification Search
CPC ......... F25B 49/025; H02P 27/08; H02P 21/22
USPC ........................................... 318/768
See application file for complete search history.

(56) References Cited

U.S. PATENT DOCUMENTS

| | | | | |
|---|---|---|---|---|
| 9,602,041 | B1* | 3/2017 | Khalaf | ..................... H02P 27/08 |
| 2003/0098298 | A1* | 5/2003 | Dohmae | ............... H02P 27/024 |
| | | | | 219/209 |
| 2006/0130504 | A1* | 6/2006 | Agrawal | ................. F25B 49/02 |
| | | | | 62/228.4 |
| 2012/0163046 | A1* | 6/2012 | Hibino | ................... H02P 27/08 |
| | | | | 363/37 |

(Continued)

FOREIGN PATENT DOCUMENTS

| | | |
|---|---|---|
| CN | 103743059 A | 4/2014 |
| JP | 7-167504 A | 7/1995 |

(Continued)

*Primary Examiner* — Kawing Chan
*Assistant Examiner* — Bradley Brown
(74) *Attorney, Agent, or Firm* — Dentons US LLP

(57) ABSTRACT

A compressor driving apparatus and an air conditioner including the same, whereby the compressor driving apparatus includes a capacitor connected to a DC terminal, an inverter, including a plurality of three-phase switching devices, to convert DC power from the capacitor into AC power to drive a compressor motor, an output current detector to detect output current flowing in the motor, and a controller to output a switching control signal for controlling the inverter based on the output current, wherein the controller performs control such that some of the three-phase switching devices in the inverter are turned on or off in a compressor preheating mode.

17 Claims, 14 Drawing Sheets

(56) References Cited

U.S. PATENT DOCUMENTS

| | | | | |
|---|---|---|---|---|
| 2014/0182318 A1* | 7/2014 | Eom | ............. | F25B 49/02 62/129 |
| 2014/0338380 A1* | 11/2014 | Kamiya | ............. | F25B 1/10 62/129 |

FOREIGN PATENT DOCUMENTS

| | | |
|---|---:|---|
| JP | 4529540 B2 | 8/2010 |
| JP | 2014-100043 A | 5/2014 |
| KR | 10-2005-0074706 A | 7/2005 |
| KR | 10-2010-0133636 A | 12/2010 |
| KR | 10-1198230 B1 | 11/2012 |
| KR | 10-1253232 B1 | 4/2013 |

\* cited by examiner

| Voltage vectors | | Common-mode volage($V_{no}$) |
|---|---|---|
| Non-zero vectors | $V_1, V_3, V_5$ | $-V_{dc}/6$ |
| | $V_2, V_4, V_6$ | $V_{dc}/6$ |
| Zero vectors | $V_0$ | $-V_{dc}/2$ |
| | $V_7$ | $V_{dc}/2$ |

FIG. 7E

| Voltage Vector | Idc ( DC current) |
|---|---|
| V1 = (100) | +ia |
| V2 = (110) | −ic |
| V3 = (010) | +ib |
| V4 = (011) | −ia |
| V5 = (001) | +ic |
| V6 = (101) | −ib |
| V7 = (000) | 0 |
| V0 = (111) | 0 |

COMPRESSOR DRIVING APPARATUS AND AIR CONDITIONER INCLUDING THE SAME

CROSS-REFERENCE TO RELATED APPLICATIONS

This application claims the priority benefit of Korean Patent Application No. 10-2016-0030222, filed on Mar. 14, 2016, and Korean Patent Application No. 10-2016-0053321, filed on Apr. 29, 2016, in the Korean Intellectual Property Office, the disclosures of which are incorporated herein by reference.

BACKGROUND OF THE INVENTION

1. Field of the invention

A compressor driving apparatus and an air conditioner including the same. More particularly, a compressor driving apparatus that is capable of accurately detecting output current despite a ringing phenomenon of a switching device, and an air conditioner including the same.

2. Description of the Related Art

An air conditioner is an apparatus that discharges cool or hot air into a room to adjust room temperature and to purify air in the room, thereby providing a comfortable room environment to users. Generally, the air conditioner includes an indoor unit installed in the room, the indoor unit including a heat exchanger, and an outdoor unit that supplies refrigerant to the indoor unit, the outdoor unit including a compressor and a heat exchanger. The compressor must be preheated. It is important to reduce the amount of noise generated by the compressor during the preheating process, and reduce power consumption.

SUMMARY OF THE INVENTION

In accordance with an embodiment of the present invention, there is provided a compressor driving apparatus including a capacitor connected to a DC terminal, an inverter, including a plurality of three-phase switching devices, to convert DC power from the capacitor into AC power to drive a compressor motor, an output current detector to detect output current flowing in the motor, and a controller to output a switching control signal for controlling the inverter based on the output current, wherein the controller performs control such that some of the three-phase switching devices in the inverter are turned on or off in a compressor preheating mode.

In accordance with another embodiment of the present invention, there is provided a compressor driving apparatus including a capacitor connected to a DC terminal, an inverter, including a plurality of switching devices, to convert DC power from the capacitor into AC power to drive a compressor motor, an output current detector to detect output current flowing in the motor, and a controller to output a switching control signal for controlling the inverter based on the output current, wherein the controller performs control such that a switching control signal comprising only non-zero vectors without zero vectors is output to the inverter.

In accordance with yet another embodiment of the present invention, there is provided an air conditioner including a compressor to compress refrigerant, a heat exchanger to perform heat exchange using the compressed refrigerant, and a compressor driving apparatus for driving the compressor, the compressor driving apparatus including a capacitor connected to a DC terminal, an inverter, including a plurality of three-phase switching devices, to convert DC power from the capacitor into AC power to drive a compressor motor, an output current detector to detect output current flowing in the motor, and a controller to output a switching control signal for controlling the inverter based on the output current, wherein the controller performs control such that some of the three-phase switching devices in the inverter are turned on or off in a compressor preheating mode.

In accordance with a further embodiment of the present invention, there is provided an air conditioner including a compressor to compress refrigerant, a heat exchanger to perform heat exchange using the compressed refrigerant, and a compressor driving apparatus for driving the compressor, the compressor driving apparatus including a capacitor connected to a DC terminal, an inverter, including a plurality of switching devices, to convert DC power from the capacitor into AC power to drive a compressor motor, an output current detector to detect output current flowing in the motor, and a controller to output a switching control signal for controlling the inverter based on the output current, wherein the controller performs control such that a switching control signal comprising only non-zero vectors without zero vectors is output to the inverter.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 7E illustrates current flowing in the DC terminal based on non-zero vectors V1 to V6 and zero vectors V0 and V7;

DETAILED DESCRIPTION OF THE PREFERRED EMBODIMENTS

Advantages and features of the present disclosure and methods for achieving the merits and characteristics will be more clearly understood from embodiments described in detail later in conjunction with the accompanying drawings. However, the present disclosure is not limited to the disclosed embodiments, but may be implemented in various different ways. The embodiments are provided to only complete the disclosure of the present disclosure and to allow a person having ordinary skill in the art to which the present disclosure pertains to completely understand the category of the invention. The present disclosure is only defined by the category of the claims. The same reference numbers are used to refer to the same or similar elements throughout the specification.

It is understood that the terms "module" and "unit," when describing the names of components are used herein to help the understanding of the components and thus they should not be considered as having specific meanings or roles. Accordingly, the terms "module" and "unit" may be used interchangeably.

Figure 1:
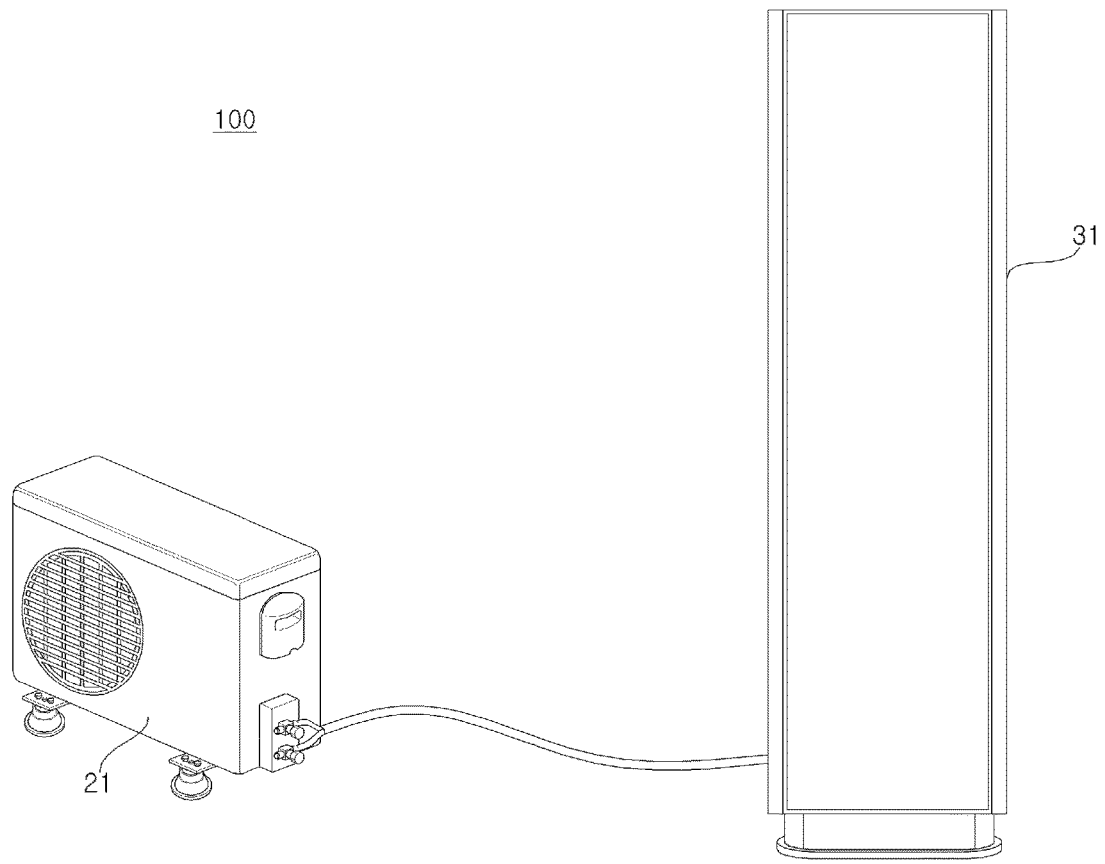
FIG. 1 is a view showing the construction of an air conditioner according to an embodiment of the present invention.

FIG. 1 is a view showing the construction of an air conditioner according to an embodiment of the present invention.

As shown in FIG. 1, the air conditioner 100 may include an indoor unit 31 and an outdoor unit 21 connected to the indoor unit 31.

The indoor unit 31 may comprise a stand type indoor unit, a wall mount type indoor unit, or a ceiling type indoor unit may be used as the indoor unit 31. FIG. 1 shows a stand type indoor unit 31.

The air conditioner 100 may further include at least one selected from among a ventilator, an air purifier, a humidifier, and a heater, which may be operated in response to the operation of the indoor unit and the outdoor unit.

The outdoor unit 21 may include a compressor (not shown) to receive and compress a refrigerant, an outdoor heat exchanger (not shown) to perform heat exchange between the refrigerant and outdoor air, an accumulator (not shown) to extract gaseous refrigerant from the supplied refrigerant and supply the extracted gaseous refrigerant to the compressor, and a four-way valve (not shown) to provide the path of the refrigerant based on the operation mode. The outdoor unit 21 may further include a plurality of sensors, a valve, and an oil collector. A description of the elements constituting the outdoor unit 21 will be omitted for convenience purposes.

The outdoor unit 21 supplies refrigerant, compressed or heat-exchanged as the result of the operation of the compressor and the outdoor heat exchanger based on the operation mode, to the indoor unit 31. The outdoor unit 21 may be driven in response to the operation of a remote controller (not shown) or the demand of the indoor unit 31. When a plurality of indoor units are driven (as opposed to a single indoor unit), with the result that the cooling/heating capacity of the air conditioner is changed, the number of indoor units to be operated and the number of compressors to be operated may be changed.

The outdoor unit 21 supplies compressed refrigerant to the indoor unit 31 to which the outdoor unit 21 is connected.

The indoor unit 31 receives the refrigerant from the outdoor unit 21 and discharges cool air or hot air into a room. The indoor unit 31 may include an indoor heat exchanger (not shown), an indoor fan (not shown), an expansion valve (not shown) to expand the refrigerant, and a plurality of sensors (not shown).

The outdoor unit 21 and the indoor unit 31 may be connected to each other via a communication line so as to enable data to be transmitted and received to and from each other. The outdoor unit 21 and the indoor unit 31 may be connected to the remote controller (not shown) in a wired or wireless fashion so as to be operated under the control of the remote controller (not shown).

Figure 2:
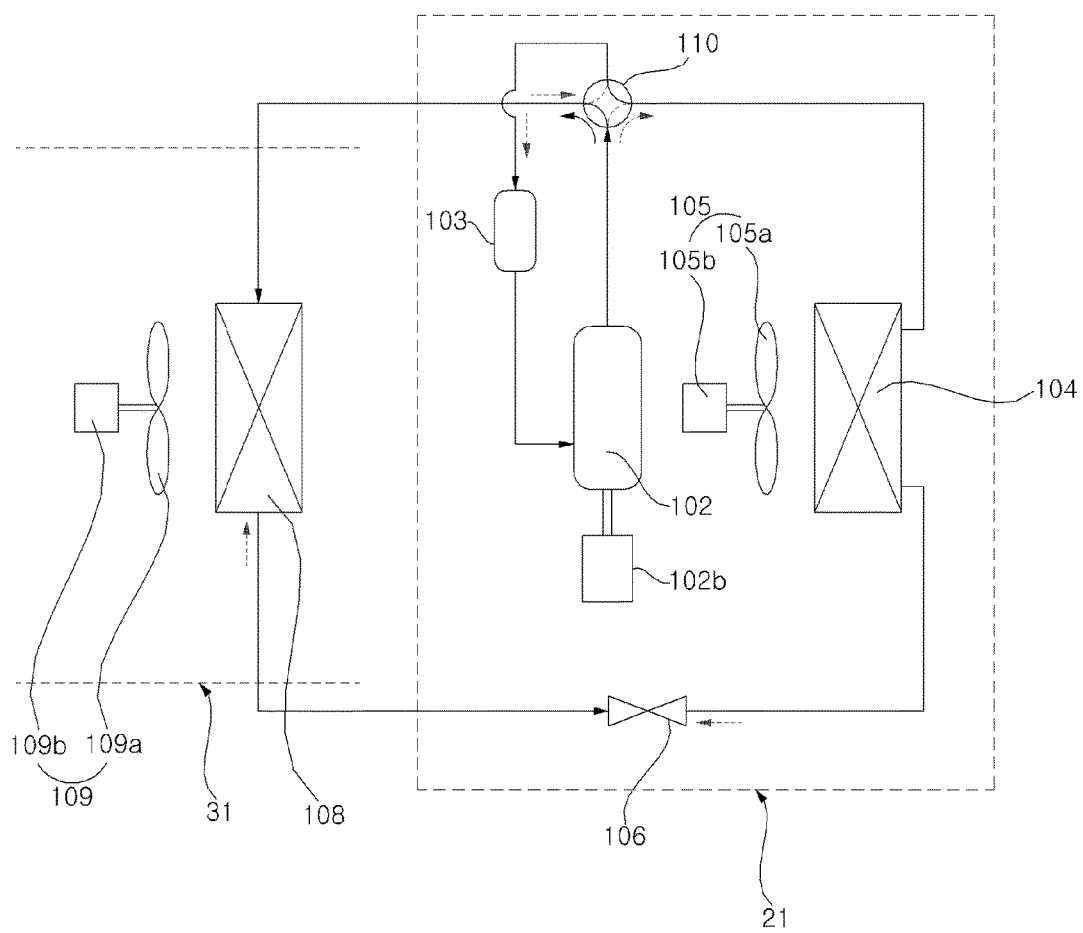
FIG. 2 is a schematic view showing an outdoor unit and an indoor unit of FIG. 1.

FIG. 2 is a schematic view showing the outdoor unit and the indoor unit of FIG. 1.

Referring to FIG. 2, the air conditioner 100 includes an outdoor unit 21 and an indoor unit 31.

The outdoor unit 21 may include a compressor 102 to compress a refrigerant, a compressor motor 102b to drive the compressor, an outdoor heat exchanger 104 to cool the compressed refrigerant, an outdoor blower 105 including an outdoor fan 105a disposed at one side of the outdoor heat exchanger 104 to accelerate or speed up the cooling of the refrigerant, and a motor 105b to power the outdoor fan 105a so that the outdoor fan 105a can rotate, an expansion device 106 to expand the condensed refrigerant, and a cooling/heating switch valve 110 to change the path of the compressed refrigerant. The outdoor unit 21 may further include an accumulator 103 to temporarily store the gaseous refrigerant, remove moisture and foreign matter from the refrigerant, and supply the refrigerant to the compressor under a predetermined pressure.

The indoor unit 31 may include an indoor heat exchanger 109 (disposed inside a room) to perform a cooling/heating operation, and an indoor blower 109. The indoor blower 109 may include an indoor fan 109a disposed at one side of the indoor heat exchanger 109 to accelerate the cooling of the refrigerant and a motor 109b to power the indoor fan 109a so that the indoor fan 109a can rotate.

At least one indoor heat exchanger 109 may be installed. The compressor 102 may be an inverter compressor or a fixed speed compressor.

The air conditioner 100 may be configured as a cooler to cool a room or as a heat pump to cool or heat a room.

The compressor 102 in the outdoor unit 21 of FIG. 2 may be driven by a compressor driving apparatus 400 (see FIG. 4) to drive a compressor motor 250.

Figure 3:
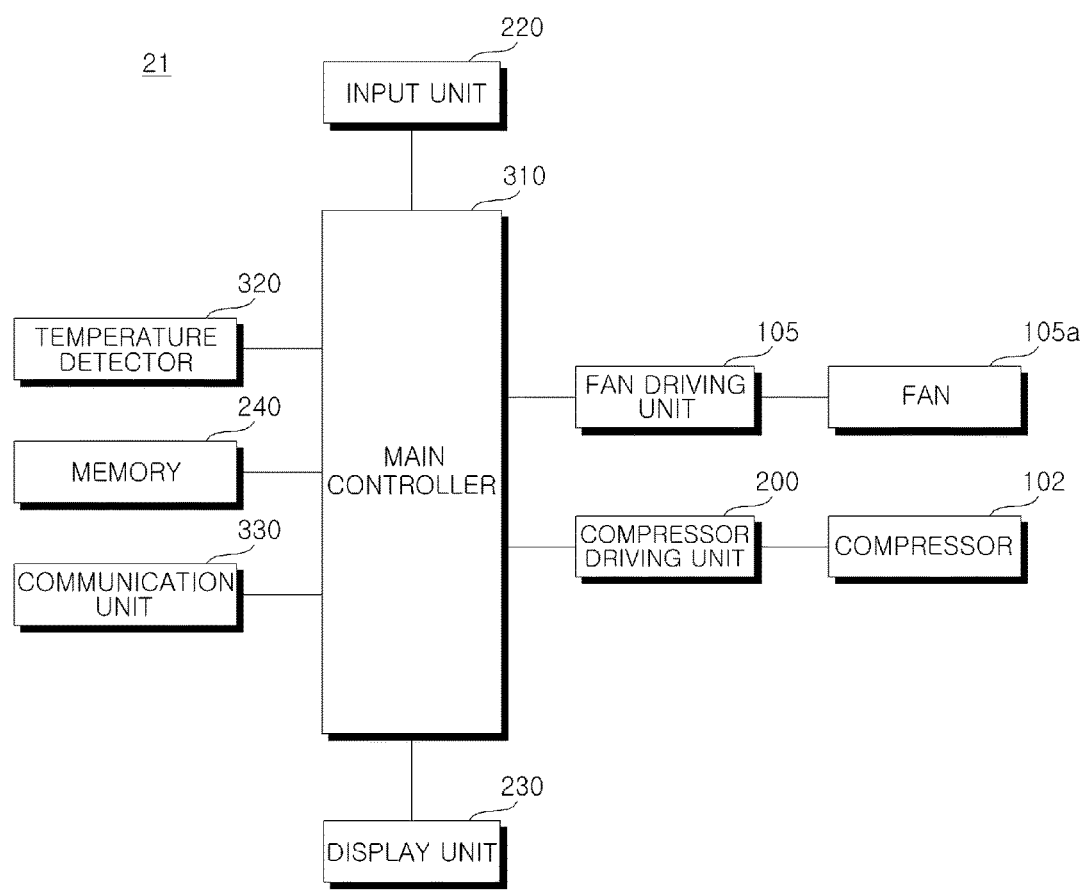
FIG. 3 is an internal block diagram showing an example of the outdoor unit of FIG. 1.

FIG. 3 is an internal block diagram showing an example of the outdoor unit of FIG. 1.

Referring to FIG. 3, the outdoor unit 21 may include a compressor 102, a fan 105a, a main controller 310, a temperature detector 320, a memory 240, and a communication unit 330. The air conditioner may further include a compressor driving unit 400, a fan driving unit 105, a display unit 230, and an input unit 220.

The compressor 102 and the fan 105a have been described with reference to FIG. 2.

The input unit 220 may include a plurality of manipulation buttons to operate the air conditioner. For example, the input unit 220 may transmit a signal indicating temperature set through the input unit 220 to the main controller 310.

The display unit 230 may display the operation state of the air conditioner.

The memory 240 may store data related to operation of the air conditioner.

The temperature detector 320 may sense the temperature in the air conditioner, and may transmit a signal indicating the sensed temperature to the main controller 310.

The temperature detector 320 may sense outdoor temperature, indoor temperature, and/or temperature of the compressor.

For example, the temperature detector 320 may sense temperature of the compressor or temperature of the surroundings of the compressor (e.g. at a discharge port of the compressor), and may transmit the sensed temperature of the compressor or the sensed temperature of the surroundings of the compressor to the main controller 310.

To control the operation of the compressor 102 and the fan 105a, the main controller 310 may control the compressor driving unit 400 and the fan driving unit 105, as shown in the figure.

For example, the main controller 310 may output a speed command signal to the compressor driving unit 400 or the fan driving unit 105.

The compressor driving unit 400 includes a compressor motor (not shown), and the fan driving unit 105 includes a fan motor (not shown). The compressor motor and the fan motor may each be rotated at a target rotational speed under the control of the main controller 310.

As described above, the main controller 310 may control the overall operation of the air conditioner, in addition to controlling the compressor 102 and the fan 105a.

As described above, the main controller 310 may control the overall operation of a refrigerant cycle based on the set temperature from the input unit 220. For example, the main controller 310 may control the operation of the four-way valve (not shown), the expansion valve (not shown), and a condenser, as well as control the compressor driving unit 400 and the fan driving unit 105.

The communication unit 330 may communicate with the indoor unit. That is, the communication unit 330 may exchange data with the indoor unit. Wired communication or wireless communication may be used. For example, power line communication may be used as the wired communication, and ZigBee®, Wi-Fi, or Bluetooth® communication may be used as the wireless communication.

The communication unit 330 may wirelessly communicate with a mobile terminal.

Figure 4:
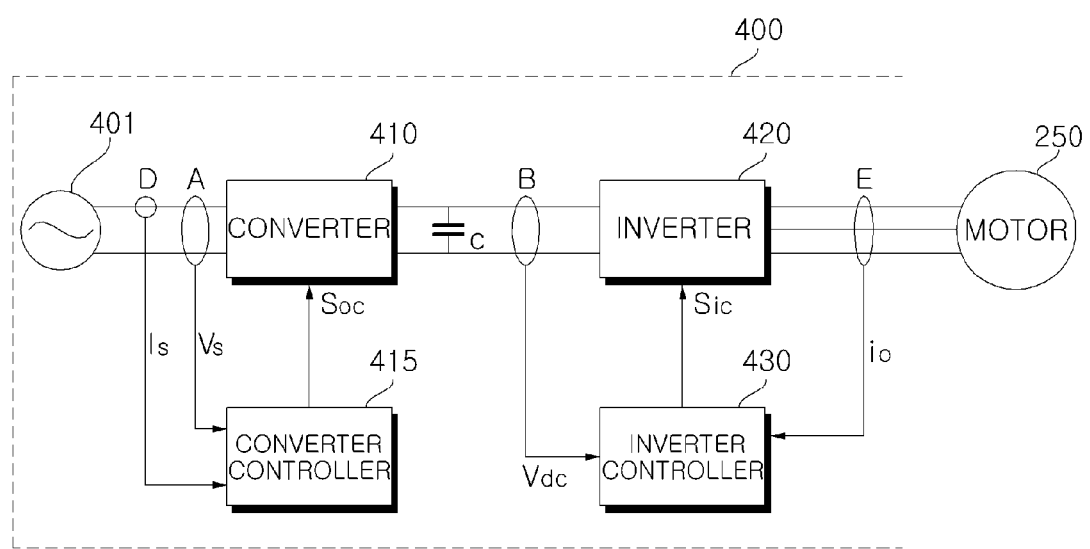
FIG. 4 is a block diagram showing a compressor driving apparatus for driving a compressor in the outdoor unit of FIG. 2.

FIG. 4 is a block diagram showing a compressor driving apparatus for driving the compressor in the outdoor unit of FIG. 2.

The compressor 102 in the outdoor unit 21 of FIG. 2 may be driven by a compressor driving apparatus 400 that drives a compressor motor 250.

The compressor driving apparatus 400 may include an inverter 420 that outputs three-phase alternating current (AC) current to a compressor motor 250, an inverter controller 430 that controls the inverter 420, a converter 410 that supplies direct current (DC) power to the inverter 420, and a converter controller 415 that controls the converter 410.

The compressor driving apparatus 400 may receive AC power from a system, convert the power, and supply the converted power to the compressor motor 250.

The compressor driving apparatus 400 may include a capacitor C connected to a DC terminal, an inverter 420, including a plurality of three-phase switching devices, to convert DC power from the capacitor C into AC power to drive the compressor motor 250, an output current detector E to detect output current flowing in the compressor motor 250, and an inverter controller 430 to output a switching control signal $S_{ic}$ to control the inverter 420 based on the output current. The inverter controller 430 may perform a control such that some of the three-phase switching devices in the inverter 420 are turned on or off in a compressor preheating mode in order to preheat the compressor while reducing the amount of electromagnetic noise. Though such configuration and control, the amount of noise generated by the compressor and power consumption may be reduced.

Particularly, in the compressor preheating mode, not all of the three-phase switching devices in the inverter 420 are turned on or off in order to reduce the amount of electromagnetic noise caused by the difference in neutral point voltage between the capacitor and the motor 250.

Meanwhile, for example, in the compressor preheating mode, the turn-on period of the switching control signal $S_{ic}$ is increased as the DC terminal voltage $V_{dc}$ is decreased or the temperature around the compressor 102 is decreased, whereby the compressor is efficiently preheated.

Meanwhile, according to another embodiment of the present invention, a compressor driving apparatus 400 may include a capacitor C connected to a DC terminal, an inverter 420, including a plurality of switching devices, to convert DC power from the capacitor C into AC power to drive the compressor motor 250, an output current detector E to detect output current flowing in the compressor motor 250, and an inverter controller 430 to output a switching control signal $S_{ic}$ for controlling the inverter 420 based on the output current. The inverter controller 430 may perform a control such that a switching control signal $S_{ic}$ including only non-zero vectors without zero vectors is output to the inverter 420 in order to preheat the compressor 102 while reducing the amount of electromagnetic noise. Though such configuration and control, the amount of noise generated by the compressor and power consumption may be reduced.

Particularly, for example, a specific one of the non-zero vectors is repeated, thereby reducing the amount of electromagnetic noise caused by the zero vectors.

Meanwhile, the converter 410, which supplies DC power to the inverter 420, may receive input AC power, and may convert the input AC power into DC power.

To this end, the converter 410 may include a rectifier (not shown) and a boost converter (not shown). The converter 410 may further include a reactor (not shown).

Meanwhile, the converter 410 may include a rectifier and an interleave boost converter (not shown).

The capacitor C is connected to the output terminal, e.g., the DC terminal, of the converter 410. The capacitor C may store power output from the converter 410. When the power output from the converter 410 is DC power, the capacitor C may be referred to as a DC terminal capacitor.

The converter controller 415 may control the converter 410, which may include a switching device.

The inverter 420 may include a plurality of inverter switching devices. The inverter 420 may convert the DC power $V_{dc}$, smoothed by the on/off operation of the switching devices, into three-phase AC power having a variable frequency, and may output the three-phase AC power to the motor 250, which is a three-phase motor.

Specifically, the inverter 420 may include a plurality of inverter switching devices. For example, upper arm switching devices Sa, Sb, and Sc and lower arm switching devices S'a, S'b, and S'c may be connected in series to each other in pairs. As a result, three pairs of upper and lower arm switching devices Sa & S'a, Sb & S'b, and Sc & S'c may be connected in parallel to each other. A diode may b e connected in reverse parallel to each of the switching devices Sa, S'a, Sb, S'b, Sc, and S'c.

The inverter controller 430 may output an inverter switching control signal $S_{ic}$ to the inverter 420 in order to control the switching operation of the inverter 420.

The inverter switching control signal $S_{ic}$, which is a pulse width modulation (PWM)-based switching control signal, may be generated and output based on output current $i_o$ flowing in the motor 250. The output current $i_o$ may be detected by an output current detector E.

A DC terminal voltage detector B may detect voltage Vdc stored in the DC terminal capacitor C. The DC terminal voltage detector B may include a voltage transformer (VT) or a resistor. The detected DC terminal voltage $V_{dc}$ may be input to the inverter controller 430.

The output current detector E may detect output current $i_o$ flowing between the inverter 420 and the motor 250. That is, the output current detector E may detect current flowing in the motor 250.

The output current detector E may detect all three-phase output currents $i_a$, $i_b$, and $i_c$. Alternatively, the output current detector E may detect two-phase output currents using three-phase equilibrium.

The output current detector E may be located between the inverter 420 and the motor 250. To detect current, a current transformer (CT) or a shunt resistor may be used as the output current detector E.

Figure 5A:
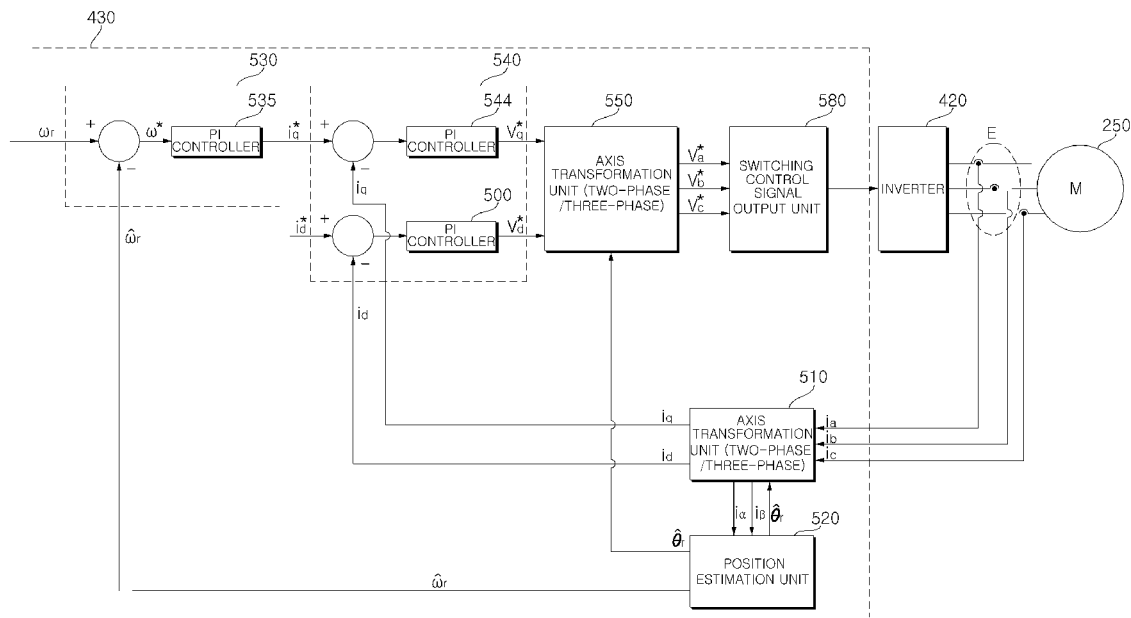
FIG. 5A is an internal block diagram showing an inverter controller of FIG. 4.

FIG. 5A is an internal block diagram showing an inverter controller of FIG. 4.

Referring to FIG. 5A, the inverter controller 430 may include an axis transformation unit 510, a position estimation unit 520, a current command generation unit 530, a voltage command generation unit 540, an axis transformation unit 550, and a switching control signal output unit 580.

The axis transformation unit 510 may receive the three-phase output currents $i_a$, $i_b$, and $i_c$ detected by the output current detector E and transform the received output currents $i_a$, $i_b$, and $i_c$ into two-phase currents $i_\alpha$ and $i_\beta$ of a stationary coordinate system.

The axis transformation unit 510 may transform the two-phase currents $i_\alpha$ and $i_\beta$ of the stationary coordinate system into two-phase currents $i_d$ and $i_q$ of a rotating coordinate system.

The position estimation unit 520 may estimate a rotor position $\hat{\theta}_r$ of the motor 250 based on the two-phase currents $i_\alpha$ and $i_\beta$ of the stationary coordinate system, transformed by the axis transformation unit 510. The position estimation unit 520 may estimate speed $\hat{\omega}_r$ calculated based on the estimated rotor position $\hat{\theta}_r$.

The current command generation unit 530 may calculate a speed command value $\omega^*_r$, based on the calculated speed $\hat{\omega}_r$ and a target speed $\omega$, and generate a current command value $i^*_q$ based on the speed command value $\omega^*_r$. For example, a PI controller 535 of the current command generation unit 530 may perform PI control based on the speed command value $\omega^*_r$, which is the difference between the calculated speed $\hat{\omega}_r$ and the target speed $\omega$, to generate a current command value $i^*_q$. Although a q-axis current command value $i^*_q$ is shown as the current command value in the figure, it is possible to generate a d-axis current command value $i^*_d$ together with the q-axis current command value $i^*_q$. The d-axis current command value $i^*_d$ may be set to 0.

The current command generation unit 530 may include a limiter (not shown) to limit the level of the current command value $i^*_q$ such that the current command value $i^*_q$ does not exceed an allowable range.

The voltage command generation unit 540 may generate d-axis and q-axis voltage command values $V^*_d$ and $V^*_q$ based on d-axis and q-axis currents $i_d$ and $i_q$ axis-transformed into a two-phase rotating coordinate system by the axis transformation unit and the current command value $i^*_d$ and $i^*_q$ generated by the current command generation unit 530. For example, a PI controller 544 of the voltage command generation unit 540 may perform PI control based on the difference between the q-axis current $i_q$ and the q-axis current command value $i^*_q$ to generate a q-axis voltage command value $V^*_q$. In addition, a PI controller 500 of the voltage command generation unit 540 may perform PI control based on the difference between the d-axis current $i_d$ and the d-axis current command value $i^*_d$ to generate a d-axis voltage command value $V^*_d$. The d-axis voltage command value $V^*_d$ may be set to 0 in the case in which the d-axis current command value $i^*_d$ is set to 0.

The voltage command generation unit 540 may include a limiter (not shown) to limit levels of the d-axis and q-axis voltage command values $V^*_d$ and $V^*_q$ such that the d-axis and q-axis voltage command values $V^*_d$ and $V^*_q$ do not exceed allowable ranges.

The generated d-axis and q-axis voltage command values $V^*_d$ and $V^*_q$ may be input to the axis transformation unit 550.

The axis transformation unit 550 may receive the calculated position $\hat{\theta}_r$ and the d-axis and q-axis voltage command values $V^*_d$ and $V^*_q$ from the position estimation unit 520 to perform axis transformation.

First, the axis transformation unit 550 may perform transformation from a two-phase rotating coordinate system to a two-phase stationary coordinate system. At this time, the position $\hat{\theta}_r$ calculated by the position estimation unit 520 may be used.

Subsequently, the axis transformation unit 550 may perform transformation from the two-phase stationary coordinate system to a three-phase stationary coordinate system. As a result, the axis transformation unit 550 outputs three-phase output voltage command values V*a, V*b, and V*c.

The switching control signal output unit 580 may generate and output a PWM-based inverter switching control signal $S_{ic}$ based on the three-phase output voltage command values V*a, V*b, and V*c.

The output inverter switching control signal $S_{ic}$ may be converted into a gate driving signal by a gate driving unit (not shown), and may then be input to a gate of each switching device of the inverter 420. As a result, the respective switching devices Sa, S'a, Sb, S'b, Sc, and S'c of the inverter 420 perform switching operations.

Figure 5B:
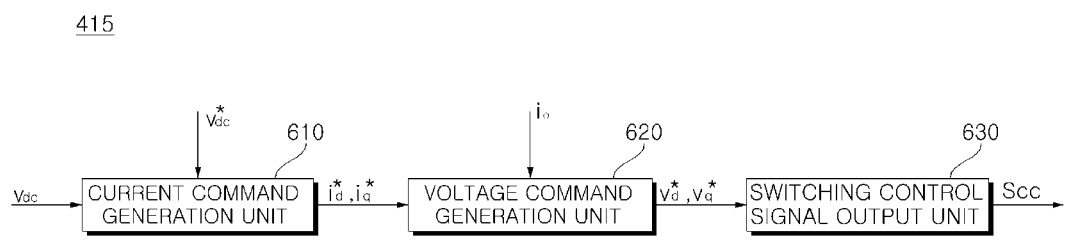
FIG. 5B is an internal block diagram showing a converter controller of FIG. 4.

FIG. 5B is an internal block diagram showing a converter controller of FIG. 4.

Referring to FIG. 5B, the converter controller 415 may include a current command generation unit 610, a voltage command generation unit 620, and a switching control signal output unit 630.

The current command generation unit 610 may generate d-axis and q-axis current command values $i^*_d$ and $i^*_q$ through a PI controller based on the DC terminal voltage $V_{dc}$ detected by the output voltage detector B, i.e. the DC terminal voltage detector B, and a DC terminal voltage command value $V^*_{dc}$.

The voltage command generation unit 620 may generate d-axis and q-axis voltage command values $V^*_d$ and $V^*_q$ through a PI controller based on the d-axis and q-axis current command values $i^*_d$ and $i^*_q$ and detected input current The switching control signal output unit 630 may output a converter switching control signal $S_{cc}$ to drive a switching device S in the converter 410 to the converter 410 based on the d-axis and q-axis voltage command values V*$_d$ and V*$_q$.

Figure 6A:
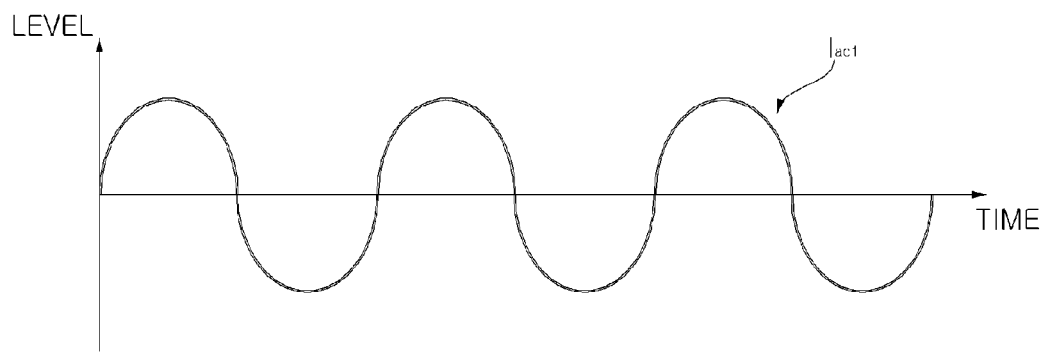
FIG. 6A is a view showing various current waveforms applied to a motor in order to preheat the compressor.
Figure 6B:
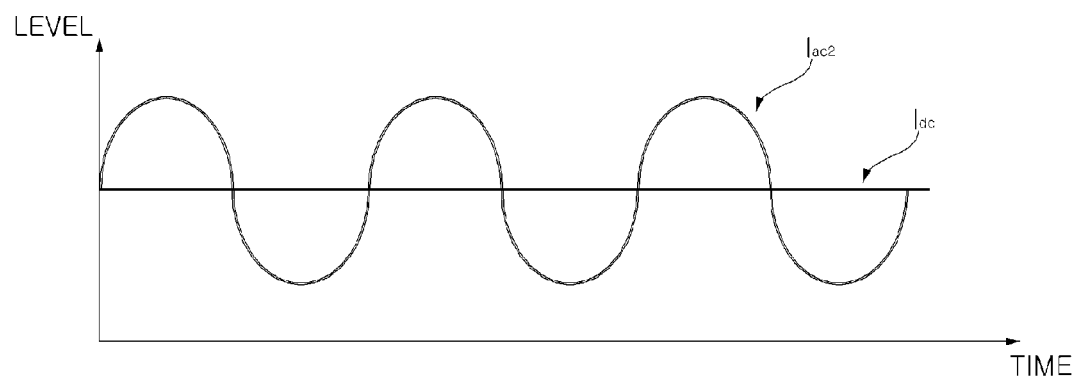
FIG. 6B is another view showing various current waveforms applied to a motor in order to preheat the compressor.

FIGS. 6A and 6B are views showing various current waveforms applied to the motor in order to preheat the compressor.

It is necessary to preheat the compressor when the surrounding temperature of the compressor is low.

The compressor may be preheated using a heater. In this case, however, a separate heater must be provided.

AC current $I_{ac1}$ may be supplied to the compressor motor 250, such as shown in FIG. 6A. Alternatively, as shown in FIG. 6B, both AC current $I_{ac2}$ and DC current $I_{dc1}$ may be supplied to the compressor motor 250. That is, an induction preheating method may be used.

For example, in the case in which the AC current $I_{ac1}$ or the AC current $I_{ac2}$ flows in the motor 250, heat is generated by an inductance component of the motor 250, whereby the motor 250 is preheated.

For example, in the case in which the DC current $I_{dc1}$ flows in the motor 250, heat is generated by a resistance component of the motor 250, whereby the motor 250 is preheated.

In the case in which the AC current $I_{ac1}$ or the AC current $I_{ac2}$ is used, as shown in FIG. 6A or 6B, electromagnetic noise, such as electromagnetic interference (EMI), is generated in the surroundings of the motor 250, which will be described with reference to FIGS. 7A to 7D.

FIGS. 7A to 7D are reference views illustrating a compressor preheating method using a space vector technique.

Figure 7A:
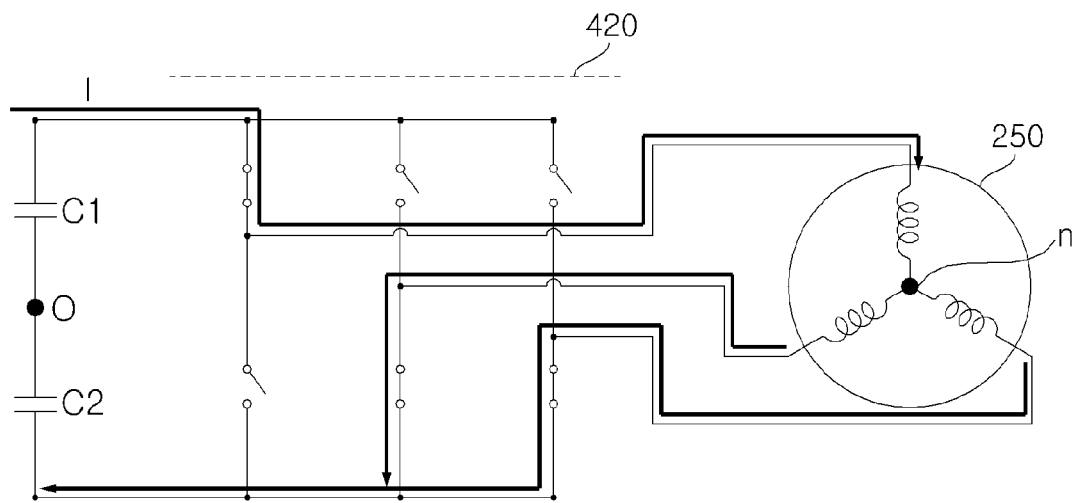
FIG. 7A is a reference view illustrating a compressor preheating method using a space vector technique.

Referring to FIG. 7A, in the case in which a plurality of capacitors C1 and C2 is used at the DC terminal, a neutral point O may be located therebetween. A neutral point n may be located in the motor 250.

FIG. 7A illustrates that the inverter 420 performs the switching operation in response to a switching control signal $S_{ic}$ corresponding to vector V1 (1,0,0) according to a space vector technique, whereby current I flows in the motor 250.

Figure 7B:
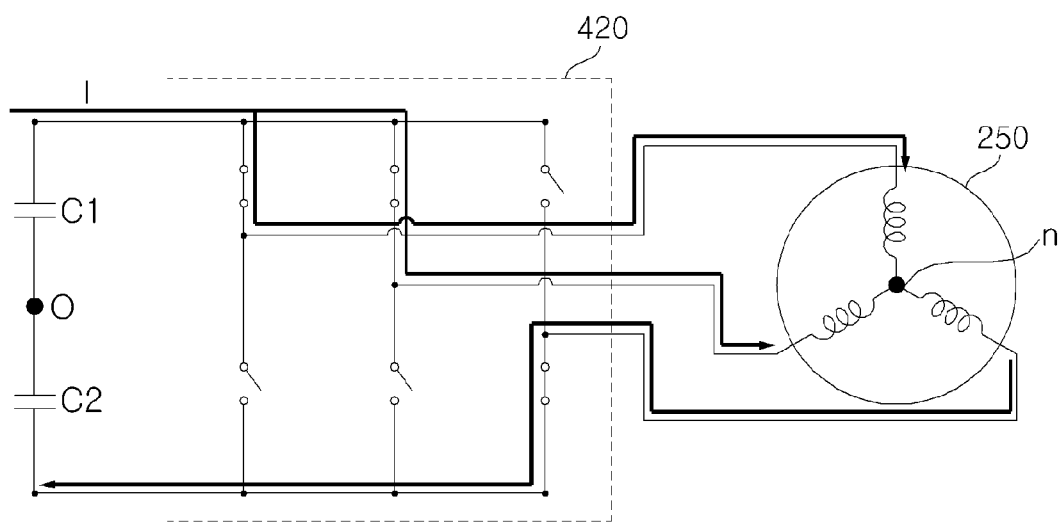
FIG. 7B is a reference view illustrating a compressor preheating method using a space vector technique.

FIG. 7B illustrates that the inverter 420 performs the switching operation in response to a switching control signal $S_{ic}$ corresponding to vector V2 (1,1,0) according to the space vector technique, whereby current I flows in the motor 250.

Figures 7C, 7D:
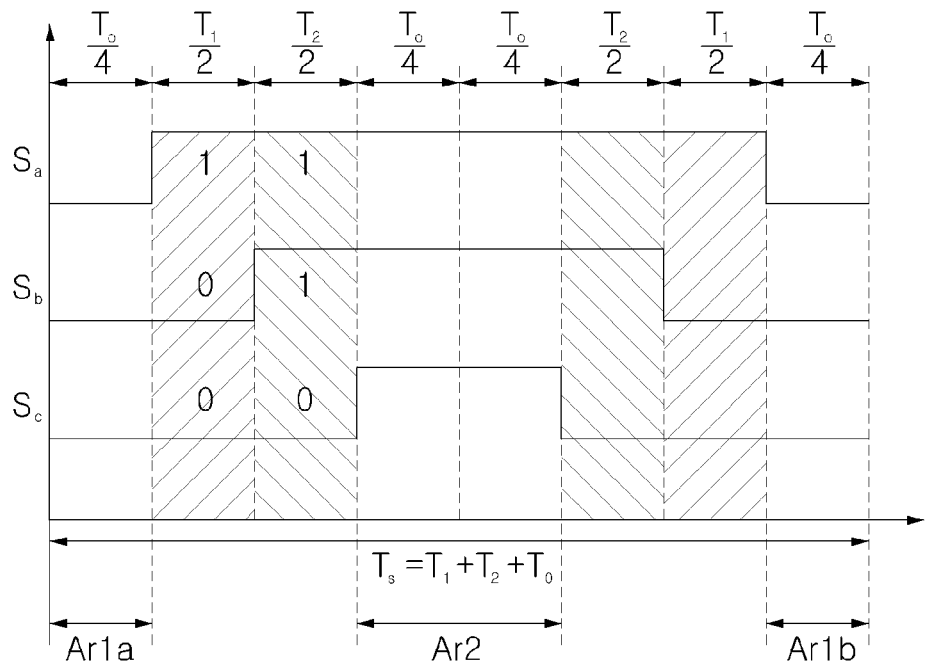
FIG. 7C is a reference view illustrating a compressor preheating method using a space vector technique.
FIG. 7D is a reference view illustrating a compressor preheating method using a space vector technique.

FIG. 7C illustrates vector V1 (1,0,0), vector V2 (1,1,0), zero vector (0,0,0), and zero vector (1,1,1). The zero vector (0,0,0) has periods Ar1$a$ and Ar1$b$, and the zero vector (1,1,1) has a period Ar2.

In the case in which a switching control signal $S_{ic}$ to switch the inverter 420 to preheat the compressor is generated based on the space vectors of FIG. 7C, excessive electromagnetic noise is generated by zero vector (0,0,0) and zero vector (1,1,1).

FIG. 7E illustrates current flowing in the DC terminal based on non-zero vectors V1 to V6 and zero vectors V0 and V7, which are space vectors. In zero vectors V0 and V7, no current flows through the DC terminal, and a closed loop is formed between the inverter 420 and the motor 250, unlike non-zero vectors V1 to V6.

Referring again to FIG. 7D, that figure illustrates common-mode voltage $V_{no}$ based on non-zero vectors V1 to V6 and common-mode voltage $V_{no}$ based on zero vectors V0 and V7. Common-mode voltage $V_{no}$ may be the potential difference between the neutral point O of the DC terminal and the neutral point n of the motor 250. The magnitude of common-mode voltage $V_{no}$ based on non-zero vectors V1 to V6 is $V_{dc}/6$, and the magnitude of common-mode voltage $V_{no}$ based on zero vectors V0 and V7 is $V_{dc}/2$. That is, the magnitude of common-mode voltage $V_{no}$ based on zero vectors V0 and V7 is three times as great as the magnitude of common-mode voltage $V_{no}$ based on non-zero vectors V1 to V6. As a result, excessive electromagnetic noise may be generated by zero vector (0,0,0) and zero vector (1,1,1).

To solve the above problem, according to embodiments of present invention, a switching control signal $S_{ic}$ including only non-zero vectors without zero vectors may be output to the inverter 420 in the compressor preheating mode such that the inverter 420 performs the switching operation based on the non-zero vectors, which will be described in more detail with reference to FIG. 8.

Figure 8:
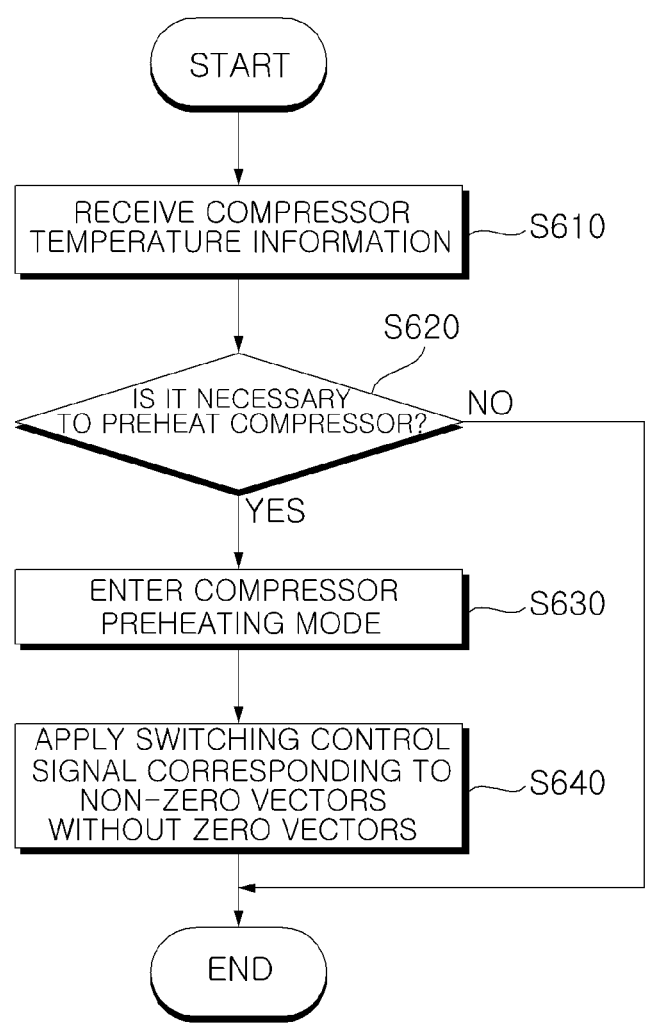
FIG. 8 is a flowchart showing an operating method of a compressor driving apparatus according to an embodiment of the present invention.

FIG. 8 is a flowchart showing an operating method of the compressor driving apparatus according to an embodiment of the present invention.

Referring to FIG. 8, the main controller 310 may receive information about the temperature of the surroundings of the compressor from the temperature detector 320.

When the surrounding temperature is lower than a reference temperature, the main controller 310 may perform control such that a compressor preheating mode for preheating the compressor is executed.

On the other hand, the main controller 310 may transmit the information about the temperature of the surroundings of the compressor to the compressor driving unit 400.

The inverter controller 430 in the compressor driving unit 400 may receive the information about the temperature of the surroundings of the compressor (S610).

Subsequently, the inverter controller 430 may determine whether it is necessary to preheat the compressor based on the information about the temperature of the surroundings of the compressor (S620).

Upon determining that it is necessary to preheat the compressor, e.g., when the temperature of the surroundings of the compressor is lower than the reference temperature, the inverter controller 430 may enter a compressor preheating mode (S630), and perform a control such that a switching control signal $S_{ic}$ including only non-zero vectors without zero vectors is output to the inverter 420, whereby the inverter 420 may perform the switching operation based on the non-zero vectors (S640).

Specifically, the inverter controller 430 may perform a control such that at least one of the three-phase switching devices Sa, Sb, and Sc in the inverter 420 is turned on or off in the compressor preheating mode.

That is, the inverter controller 430 may perform control such that not all of the three-phase switching devices Sa, Sb, and Sc in the inverter 420 are turned on or off. As a result, zero vector (0,0,0) and zero vector (1,1,1) are not generated.

For example, the inverter controller 430 may perform a control such that a switching control signal $S_{ic}$ including only non-zero vectors without zero vectors is output to the inverter 420.

As a result, the compressor may be preheated while reducing the amount of electromagnetic noise. In addition, the amount of noise generated by the compressor and power consumption may be reduced.

The inverter controller 430 may perform control such that, when a switching control signal $S_{ic}$ including only non-zero vectors without zero vectors is generated, a specific one of the non-zero vectors is repeated.

Figure 9A:
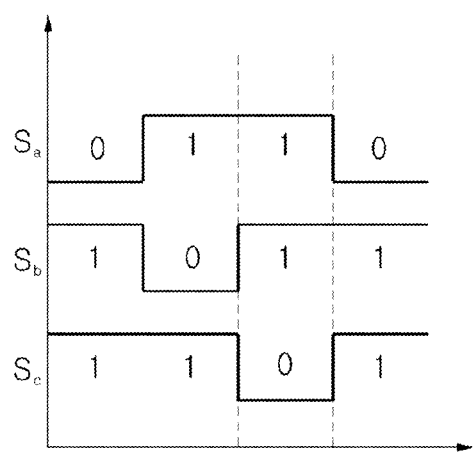
FIG. 9A is a reference view illustrating the operating method of FIG. 8.
Figure 9B:
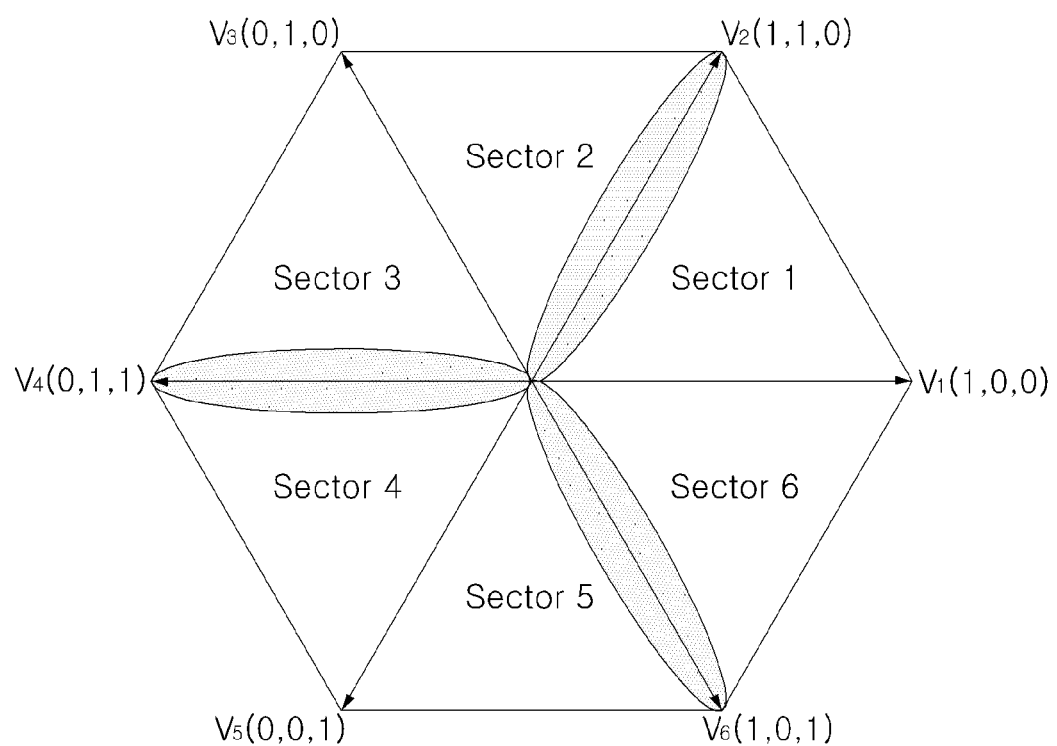
FIG. 9B is another reference view illustrating the operating method of FIG. 8.

FIGS. 9A and 9B illustrate that an inverter switching control signal $S_{ic}$ for preheating the compressor is generated using only vector V4 (0,1,1), vector V6 (1,0,1), and vector V2 (1,1,0), among non-zero vectors V1 to V6.

Referring to FIG. 9A, no zero vectors are generated. Consequently, the amount of electromagnetic noise generated between the capacitor and the motor 250 is reduced, as previously described. Consequently, the compressor may be preheated while reducing electromagnetic noise.

As shown in FIGS. 9A and 9B, the inverter controller 430 may perform control such that only vector V4 (0,1,1), vector V6 (1,0,1), and vector V2 (1,1,0) are repeatedly used in order to preheat the compressor.

Alternatively, unlike shown in FIGS. 9A and 9B, an inverter switching control signal $S_{ic}$ for preheating the compressor may be generated using only vector V1 (1,0,0), vector V3 (0,1,0), and vector V5 (0,0,1), among non-zero vectors V1 to V6.

The inverter controller 430 may perform a control such that a turn-on period of the switching control signal $S_{ic}$ is changed depending on target power in the compressor preheating mode.

For example, the inverter controller 430 may perform a control such that the turn-on period of the switching control signal $S_{ic}$ is increased as the target power is increased in the compressor preheating mode. That is, the inverter controller 430 may perform control such that duty is increased.

Figure 10:
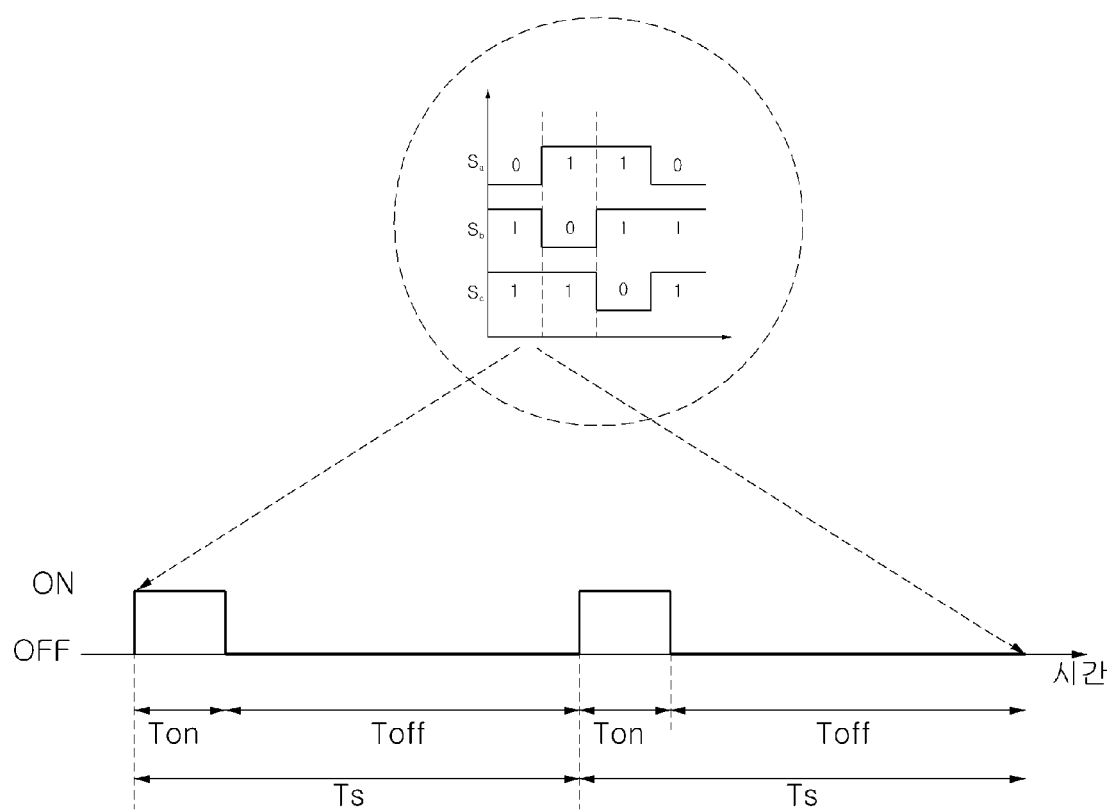
FIG. 10 is another reference view illustrating the operating method of FIG. 8.

FIG. 10 illustrates a turn-on period Ton and a turn-off period Toff of a switching device based on a switching control signal $S_{ic}$ generated using a specific non-zero vector, according to an embodiment of the invention.

The inverter controller 430 may perform a control such that the turn-on period Ton is increased and the turn-off period Toff is decreased as the target power is increased in the compressor preheating mode.

The target power may be set based on the temperature of the surroundings of the compressor or the voltage of the DC terminal.

The inverter controller 430 may perform control such that the target power is increased as the temperature of the surroundings of the compressor or the voltage of the DC terminal is decreased.

Figure 11A:
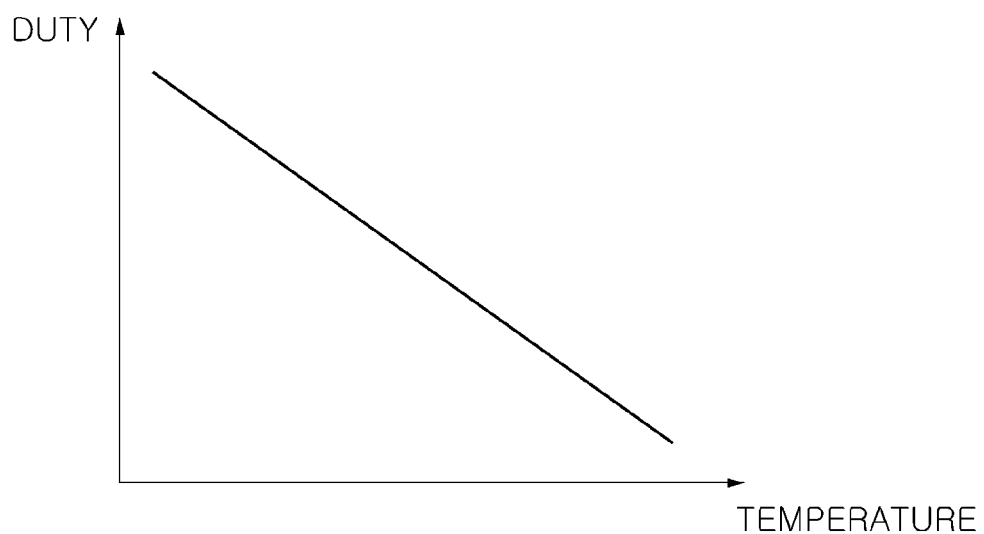
FIG. 11A is another reference view illustrating the operating method of FIG. 8.

For example, as shown in FIG. 11A, the inverter controller 430 may perform a control such that the turn-on period of the switching control signal $S_{ic}$ is increased as the temperature of the surroundings of the compressor is decreased and such that the turn-on period of the switching control signal $S_{ic}$ is decreased as the temperature of the surroundings of the compressor is increased, in the compressor preheating mode. Consequently, the compressor may be efficiently preheated.

Figure 11B:
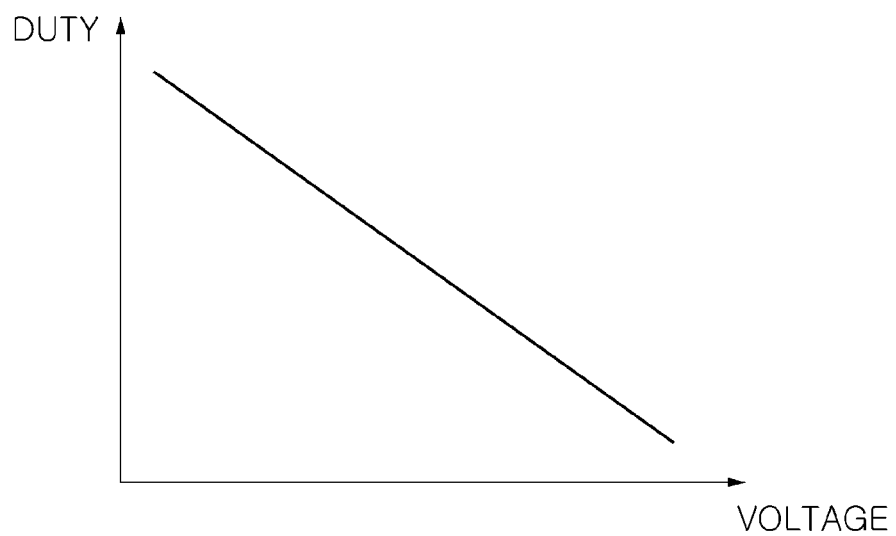
FIG. 11B is another reference view illustrating the operating method of FIG. 8.

Additionally, as shown in FIG. 11B, for example, the inverter controller 430 may perform a control such that the turn-on period of the switching control signal $S_{ic}$ is increased as the voltage $V_{dc}$ of the DC terminal is decreased and such that the turn-on period of the switching control signal $S_{ic}$ is decreased as the voltage $V_{dc}$ of the DC terminal is increased, in the compressor preheating mode. Consequently, the compressor may be efficiently preheated.

"DUTY" shown in FIG. 11A or 11B may correspond to the turn-on period of the switching control signal $S_{ic}$.

The compressor driving apparatus or the air conditioner including the same according to the embodiments of the present invention may not be limitedly applied to the construction and method of the embodiments as previously described; however, all or some of the embodiments may be selectively combined to achieve various modifications.

As described, the operation method of the compressor driving apparatus or the air conditioner according to an embodiment of the present invention may be implemented as code that can be written on a processor-readable recording medium and thus read by a processor provided in the compressor driving apparatus or the air conditioner. The processor-readable recording medium may be any type of recording device in which data are stored in a processor-readable manner. The processor-readable recording medium may include, for example, a read only memory (ROM), a random access memory (RAM), a compact disk read only memory (CD-ROM), a magnetic tape, a floppy disk, and an optical data storage device, or may be implemented in the form of a carrier wave transmitted over the Internet. In addition, the processor-readable recording medium can be distributed over a plurality of computer systems connected to a network such that processor-readable code is written thereto and executed therefrom in a distributed manner.

Meanwhile, as is apparent from the above description, in a compressor driving apparatus and an air conditioner including the same according to an embodiment of the present invention, the compressor driving apparatus includes a capacitor connected to a DC terminal, an inverter, including a plurality of three-phase switching devices, to convert DC power from the capacitor into AC power to drive a compressor motor, an output current detector to detect output current flowing in the motor, and a controller to output a switching control signal for controlling the inverter based on the output current, wherein the controller performs control such that some of the three-phase switching devices in the inverter are turned on or off in a compressor preheating mode. Consequently, the compressor may be preheated while reducing the amount of electromagnetic noise. In addition, the amount of noise generated by the compressor and power consumption may be reduced.

Particularly, in the compressor preheating mode, not all of the three-phase switching devices are turned on or off in order to reduce the amount of electromagnetic noise caused by the difference in neutral point voltage between the capacitor and the motor.

As described, in the compressor preheating mode, the turn-on period of the switching control signal is increased as DC terminal voltage is decreased or as the temperature around the compressor is decreased, whereby the compressor is efficiently preheated.

Meanwhile, as described, in a compressor driving apparatus and an air conditioner including the same according to an embodiment of the present invention, the compressor driving apparatus includes a capacitor connected to a DC terminal, an inverter, including a plurality of switching devices, to convert DC power from the capacitor into AC power to drive a compressor motor, an output current detector to detect output current flowing in the motor, and a controller to output a switching control signal for controlling the inverter based on the output current, wherein the controller performs control such that a switching control signal comprising only non-zero vectors without zero vectors is output to the inverter. Consequently, the compressor may be preheated while reducing the amount of electromagnetic noise. In addition, the amount of noise generated by the compressor and power consumption may be reduced.

Particularly, a specific one of the non-zero vectors is repeated, thereby reducing the amount of electromagnetic noise caused by the zero vectors.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A compressor driving apparatus comprising: a temperature detector to sense temperature of compressor or temperature of surroundings of the compressor;
a capacitor connected to a DC terminal;
an inverter, comprising a plurality of three-phase switching devices, to convert DC power from the capacitor into AC power to drive a compressor motor;
an output current detector to detect output current flowing in the motor, the output current detector located between the inverter and the motor; and
a controller to output a switching control signal for controlling the inverter based on the output current,
wherein when the temperature of the surroundings of the compressor is lower than a reference temperature, the controller is configured to enter a compressor preheating mode,
wherein the controller performs control such that some of the three-phase switching devices in the inverter are turned on or off in the compressor preheating mode,
wherein, in the compressor preheating mode, the controller performs control such that a first switching control signal comprising only a plurality of non-zero vectors without zero vectors is output to the inverter, and
wherein, in the compressor preheating mode, the controller performs control such that the first switching control signal comprising only three non-zero vectors among the plurality of non-zero vectors,
wherein after termination of the compressor preheating mode, the controller performs control such that a second switching control signal comprising the non-zero vectors and a third switching control signal comprising the zero vectors are output to the inverter;
wherein no current flows through the DC terminal during outputting the third switching control signal.

2. The compressor driving apparatus according to claim 1, wherein the controller performs control such that not all of the three-phase switching devices in the inverter are turned on or off in the compressor preheating mode.

3. The compressor driving apparatus according to claim 1, wherein the controller performs control such that a specific one of the non-zero vectors is repeated in the compressor preheating mode.

4. The compressor driving apparatus according to claim 1, wherein the controller performs control such that a turn-on period of the first switching control signal is changed depending on target power in the compressor preheating mode.

5. The compressor driving apparatus according to claim 1, wherein the controller performs control such that a turn-on period of the first switching control signal is increased as a temperature of surroundings of the compressor is decreased in the compressor preheating mode.

6. The compressor driving apparatus according to claim 1, wherein the controller performs control such that a turn-on period of the first switching control signal is increased as a voltage of the DC terminal is decreased in the compressor preheating mode.

7. The compressor driving apparatus according to claim 1, wherein the controller performs control such that AC current flows in the motor in response to the first switching control signal in the compressor preheating mode.

8. The compressor driving apparatus according to claim 1, wherein the controller performs control such that both AC current and DC current flow in the motor in response to the first switching control signal in the compressor preheating mode.

9. The compressor driving apparatus according to claim 1, further comprising a converter to convert input AC power into DC power and to output the converted DC power to the DC terminal.

10. The compressor driving apparatus according to claim 1, wherein the controller comprises:
an estimation unit to estimate a position and a speed of a rotor of the motor based on the output current;
a current command generation unit to generate a current command value based on the estimated speed and a speed command value;
a voltage command generation unit to generate a voltage command value based on the current command value and the output current flowing in the motor; and
a switching control signal output unit to generate and to output the first switching control signal or the second switching control signal based on the voltage command value.

11. An air conditioner comprising:
a compressor to compress refrigerant;
a temperature detector to sense temperature of the compressor or temperature of the surroundings of the compressor;
a heat exchanger to perform heat exchange using the compressed refrigerant; and a compressor driving apparatus for driving the compressor, the compressor driving apparatus comprising:
a capacitor connected to a DC terminal;
an inverter, comprising a plurality of three-phase switching devices, to convert DC power from the capacitor into AC power to drive a compressor motor;
an output current detector to detect output current flowing in the motor, the output current detector located between the inverter and the motor; and
a controller to output a switching control signal for controlling the inverter based on the output current,
wherein when the temperature of the surroundings of the compressor is lower than a reference temperature, the controller is configured to enter a compressor preheating mode,
wherein the controller performs control such that some of the three-phase switching devices in the inverter are turned on or off in the compressor preheating mode,
wherein, in the compressor preheating mode, the controller performs control such that a first switching control signal comprising only a plurality of non-zero vectors without zero vectors is output to the inverter,
wherein, in the compressor preheating mode, the controller performs control such that the first switching control signal comprising only three non-zero vectors among the plurality of non-zero vectors,
wherein after termination of the compressor preheating mode, the controller performs control such that a second switching control signal comprising the non-zero vectors and a third switching control signal comprising the zero vectors are output to the inverter,
wherein no current flows through the DC terminal during outputting the third switching control signal.

12. The air conditioner according to claim 11, wherein the controller performs control such that not all of the three-phase switching devices in the inverter are turned on or off in the compressor preheating mode.

13. The air conditioner according to claim 11, wherein the controller performs control such that a specific one of the non-zero vectors is repeated in the compressor preheating mode.

14. The air conditioner according to claim 11, wherein the controller performs control such that a turn-on period of the first switching control signal is changed depending on target power in the compressor preheating mode.

15. The air conditioner according to claim 11, wherein the controller performs control such that a turn-on period of the first switching control signal is increased as a temperature of surroundings of the compressor is decreased or as a voltage of the DC terminal is decreased in the compressor preheating mode.

16. The air conditioner according to claim 11, wherein the controller performs control such that AC current flows in the motor in response to the first switching control signal in the compressor preheating mode.

17. The air conditioner according to claim 11, wherein the controller performs control such that both AC current and DC current flow in the motor in response to the first switching control signal in the compressor preheating mode.

* * * * *